US005528582A

United States Patent [19]
Bodeep et al.

[11] Patent Number: 5,528,582
[45] Date of Patent: Jun. 18, 1996

[54] NETWORK APPARATUS AND METHOD FOR PROVIDING TWO WAY BROADBAND COMMUNICATIONS

[75] Inventors: George E. Bodeep, Point Pleasant; Thomas E. Darcie, Middletown; Xiaolin Lu, Matawan, all of N.J.

[73] Assignee: AT&T Corp., Murray Hill, N.J.

[21] Appl. No.: 282,247

[22] Filed: Jul. 29, 1994

[51] Int. Cl.$^6$ ...................................................... H04N 7/14
[52] U.S. Cl. ............................ 370/24; 370/49.5; 370/50; 370/123; 370/73; 370/124; 370/79; 375/257; 455/5.1; 348/12; 348/13; 359/125; 359/137
[58] Field of Search .................................. 370/16, 24, 29, 370/30, 37, 49.5, 50, 69.1, 123, 124, 71, 73, 79; 379/58, 59; 375/257; 455/5.1, 33.1; 348/12, 13; 359/113, 114, 125, 137, 135, 136

[56] References Cited

U.S. PATENT DOCUMENTS

| | | | |
|---|---|---|---|
| 4,079,414 | 3/1978 | Sullivan | 455/33.1 X |
| 4,347,604 | 8/1982 | Saito et al. | 370/24 X |
| 4,494,138 | 1/1985 | Shimp | 455/5.1 X |
| 4,686,667 | 8/1987 | Ohnsorge | 359/137 |
| 5,189,673 | 2/1993 | Burton et al. | 370/58.2 X |
| 5,263,021 | 11/1993 | Ortel | 370/124 X |
| 5,321,514 | 6/1994 | Martinez | 348/723 |

OTHER PUBLICATIONS

Stephen D. Dukes, "Next Generation Cable Network Architecture," 1993 NCTA Technical Papers, p. 8 and FIG. 15. Comment: Technological background; describes parallel coaxial network.

Lee Thompson, "Introduction to Cable Television Technology, OFC 94" (Short Course), Feb. 1994, p. 6.1. Comment: Background of invention; viewgraph shows coaxial telecommunications spectrum.

Roger Brown, "Jerrold/GI Develops Architecture To Support Interactivity," CED: Communications Engineering and Design, Dec. 1993, p. 22. Comment: Technological background.

Primary Examiner—Douglas W. Olms
Assistant Examiner—Russell Blum
Attorney, Agent, or Firm—John A. Caccuro

[57] ABSTRACT

A communication network (e.g., a coax network or an optical fiber network) comprises a signal distribution network (e.g., fiber node FN) for transmitting communication signals downstream over a first communication path to a plurality of end user apparatuses connected thereto. At least one end user apparatus is arranged for sending the return signals downstream over at least part of the first communication path to a converter apparatus which collects the return signals and converts them to an upstream signal for transmission over a second separate communication path to the distribution unit.

38 Claims, 6 Drawing Sheets

NETWORK APPARATUS AND METHOD FOR PROVIDING TWO WAY BROADBAND COMMUNICATIONS

TECHNICAL FIELD

This invention relates to broadband communications and, more particularly, to providing two-way broadband communications by adding a separate communication path to the existing one-way broadband network.

BACKGROUND OF THE INVENTION

Fiber/coax networks (FCNs) that combine the low cost and large bandwidth of coaxial cable with the flexibility of lightwave feeder technology have been shown to be a very promising system architecture for current and near-future broadband local access applications. Optical fiber is used to span large distances from the central office (CO) to the remote fiber node (FN) where the coaxial cable distributes information to the end users (EUs). FCNs offer an immediate low-cost path to any presently defined broadband or narrowband, broadcast or switched, analog or digital services and can be upgraded to provide increased bandwidth for interactive multimedia services or other future services. For cable TV companies, the advantages of this architecture have already been demonstrated where the migration from pure coax to fiber/coax networks has resulted in improved signal quality, higher reliability and greatly increased bandwidth (approaching 1 GHz) to the homes. For local exchange carriers (LECs), FCNs provide sufficient bandwidth for video services for less cost than alternative subscriber loop systems. With its low cost, large bandwidth, and high penetration (95% of U.S. homes have been passed by existing cable TV coax networks), FCNs are presently the most popular broadband access infrastructure for current and near-future information services.

To realize the full potential of FCNs, more technical innovation is required. One of the most important challenges is to cost-effectively provide broadband two-way services over a system that has been designed primarily for distributed broadcast television services. Proposed FCNs support limited two-way services by defining the upstream traffic in the traditional upstream frequency band of 5–40 MHz as shown by band Upstream 1 in FIG. 1. However, this small upstream bandwidth limits services that can be provided. Further, due to heavy in-the-air traffic (i.e., amateur radio) in that frequency range, ingress noise in the coaxial cable seriously degrades channel performance.

To overcome this ingress noise and create more upstream bandwidth, one approach is to use a high-frequency split plan, where the upstream traffic is located in one band at frequencies greater than the downstream band, as shown by Upstream 2 in FIG. 1. This approach does not affect existing downstream services and has low ingress noise in the broadband return path. However, both this approach and the traditional approach have the limitation that the total bandwidth has to be pre-divided into downstream and upstream bands, with diplexers (or triplexers) and separate upstream amplifiers installed in all amplifiers to provide non-overlapping bi-directional paths. Downstream and upstream bandwidth allocations are then restricted to those defined during construction and cannot be changed without fully renovating the coax network. This fixed pre-provision frequency plan limits the network's capability to support wide varieties of future broadband two-way symmetric and asymmetric services.

SUMMARY OF THE INVENTION

In accordance with the present invention, a communication network (e.g., a coax network or an optical fiber network) comprises a signal distribution unit (e.g., fiber node FN) for transmitting frequency-division multiplexed communication signals downstream over a first communication path to a plurality of end user apparatuses connected thereto. At least one end user apparatus is arranged for sending return signals downstream over at least a portion of the first communication path to a converter apparatus which collects the return signals and converts them to an upstream signal for transmission upstream over a second separate communication path to the distribution unit. The second communication path may be a wire pair, a coaxial cable, an optical fiber, or a radio communication path.

Another network embodiment includes a uni-directional primary path and a bi-directional access path where at least one end user apparatus sends return signals upstream over the bi-directional access path to a node apparatus which combines downstream signals from the primary path and upstream signals from the access path into a combined signal which is transmitted to a converter apparatus. The converter apparatus receives and converts a portion of the combined signal to an upstream signal for transmission over a second separate communication path to the distribution unit.

DETAILED DESCRIPTION

Figure 1:
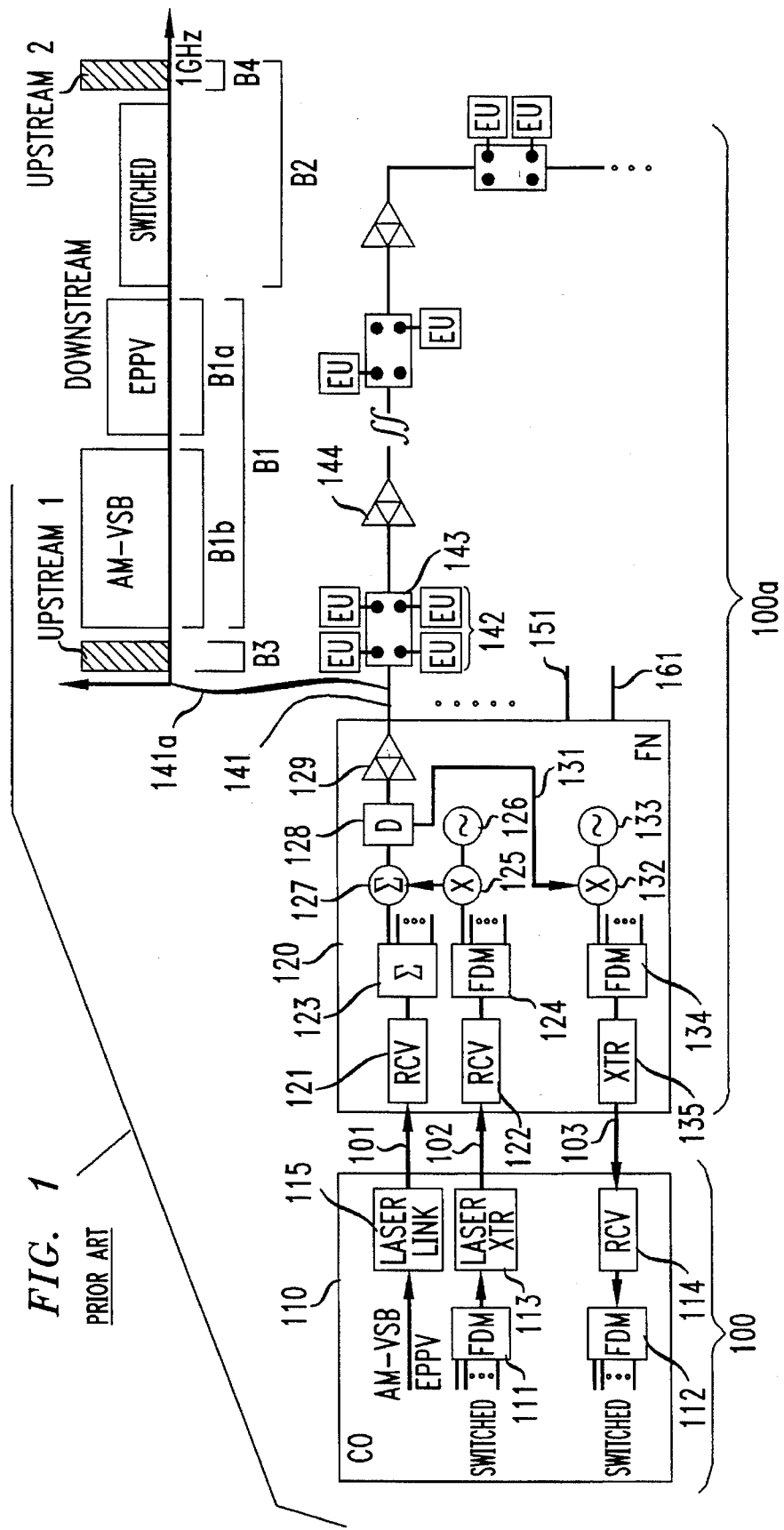
FIG. 1 shows a prior art proposed network for providing two-way broadband communications.

With reference to FIG. 1, an illustrative prior art fiber/coax network (FCN) proposal for a two-way broadband network is described. FIG. I shows a head-end or telephone switching network 100 which connects via optical fibers 101–103 to a coaxial cable distribution network 100a. The telephone switching network 100 includes central office (CO) 110 which couples switched signals (such as telephone, fax, data, etc.) via frequency-division multiplexing (FDM) unit 111 to transmitter laser 113 for transmission over optical fiber 102. Laser transmitter 113 may or may not be the same laser 115 as used for transmitting other broadcast information, such as multiple CATV channels (AM-VSB) or enhanced pay-per-view (EPPV) channels. Digital EPPV signals can be transmitted in groups using FDM and digital modem technology.

Optical signals received over optical fiber 103 are converted to an electrical signal by optical receiver unit 114 and demultiplexed by FDM unit 112 into narrowband channels that contain switched signals.

As shown, the broadcast and switched services signals are transmitted to signal distribution unit, referred to hereinafter as fiber node (FN), 120 over two separate optical fibers 101 and 102, respectively. At FN 120, the signals are received and converted to electrical signals by receivers 121, 122. As shown, FN 120 serves a plurality of coaxial cables 141,151 and 161. Illustratively, only the combining of the broadcast and switched signals for downstream and upstream transmission over coaxial cable 141 is shown in FIG. 1. Using similar components, broadcast and switched signals from FDM 124 and to FDM 134 would be converted to handle, respectively, communications to or from coaxial cables 151 and 161 and to respective end units connected thereto.

The switched signal outputted from FDM 124 is frequency-shifted using mixer 125 and local oscillator 126 to a pre-assigned frequency and combined with the broadcast signal from splitter 123 in combiner 127 for transmission over coaxial cable 141. On coaxial cable 141, as shown by 141a, the CATV broadcast services use the AM-VSB band B1b and the EPPV channels use band B1a, for example, of the 55.25 MHz–500 MHz frequency band B1. The switched services use the frequency band B2, which, in this example, is greater than 500 MHz and less than 1 GHz. FDM 124 could be replaced with a splitter and frequency-shifting components 125 and 126 could be eliminated if the same switched information were to be transmitted on each coaxial cable 141, 151 and 161.

In FN 120, diplexer 128 couples the signal from combiner 127 to bi-directional amplifier 129 for transmission/reception over coaxial cable 141. The diplexer 128 enables the received signal 131 received over coaxial cable 141 to be separated from the transmitted signal being sent over coaxial cable 141. The received signal 131 is a narrowband upstream signal which occupies the frequency band B3 extending typically from 5–40 MHz. The received signal 131 is frequency-shifted by mixer 132 and local oscillator 133 and then frequency multiplexed by FDM 134 and convened to an optical signal by laser transmitter (XTR) 135 for transmission over optical fiber 103 to CO 110. The laser transmitter 135 also, like laser 113, uses a digital modulation format (i.e., 16 or 64 QAM, QPSK). FDM 134 and frequency-shifting apparatus 132 and 133 could be eliminated if all users on coaxial cables 141, 151 and 161 were to share the same upstream bandwidth.

The coaxial cable 141, illustratively, distributes signals to and receives signals from a plurality of end user (EU) units (e.g., 142) using a plurality of cable taps (e.g., 143). Bi-directional amplifiers (e.g., 144) maintain the desired signal levels on coaxial cable 141.

As previously noted, the 5–40 MHz upstream bandwidth B3 presents a bandwidth bottleneck to providing additional services to the end users that connect to coaxial cable 141. Additionally, ingress noise induces channel impairment in the 5–40 MHz band. While some of the downstream frequency band B2, 500 MHz–1 GHz, can be allocated to upstream communications, such an allocation would require modified diplexers (e.g., 128) that would have to be changed whenever a change in allocation is made.

Figure 2:
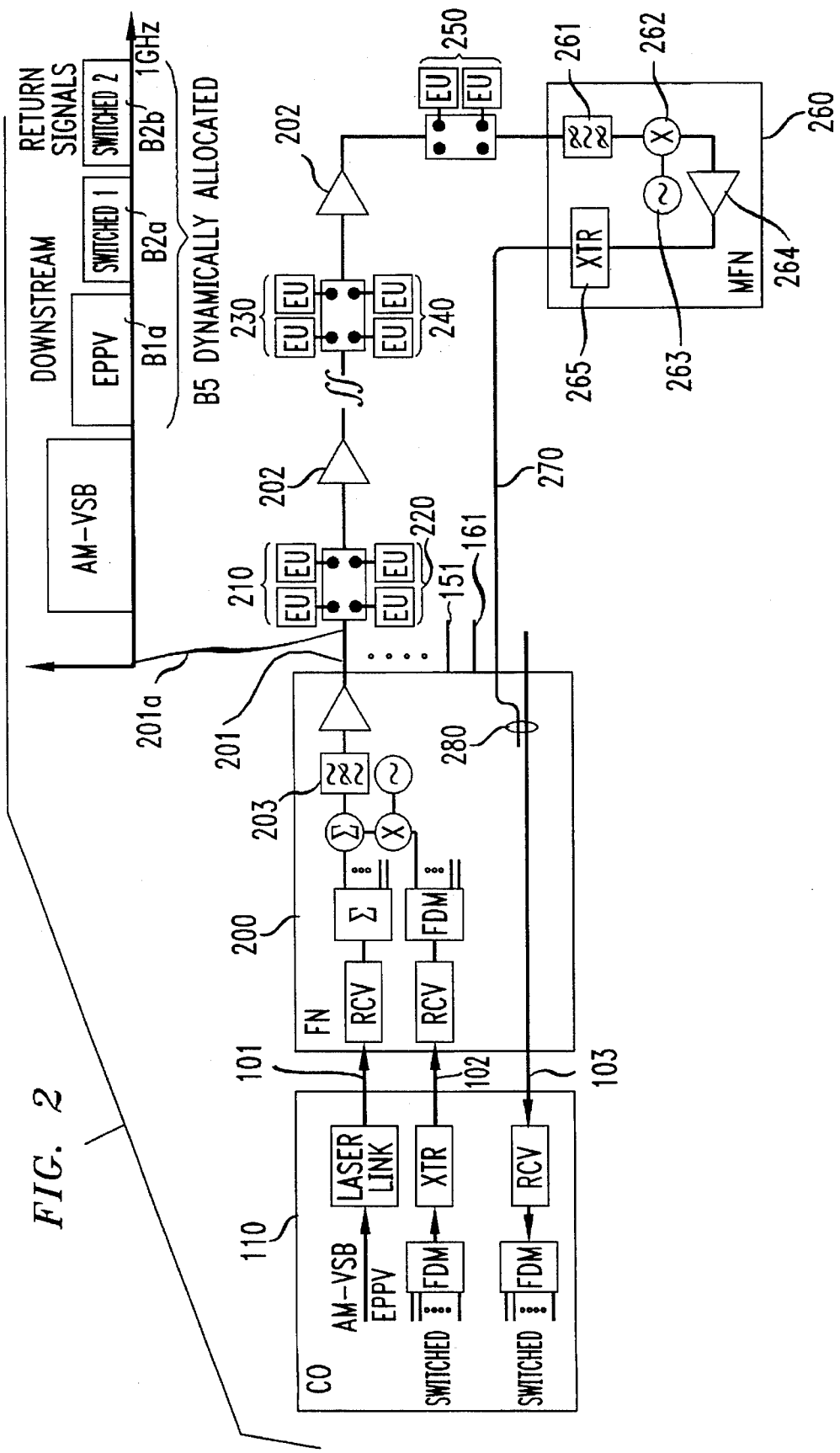
FIG. 2 shows an illustrative embodiment of a two-way broadband network in accordance with the present invention.

A two-way broadcast communication network in accordance with the present invention is illustrated in FIG. 2. In FIG. 2 all components that are numbered the same as components in FIG. 1 operate in the same manner (i.e., all those components that begin with the number 1). Since the components used in FIG. 2 are essentially the same as those well-known components used in the prior art system shown in FIG. 1, they will not be described further. The operation of such components are generally described, for example, in the book entitled *Cable Television*, by William O. Grant, published in 1988 by GWG Associates (New York).

In FIG. 2, downstream communications between FN 200 and end user units 210–250 utilize the existing coaxial cable 201 broadcast network. The fiber node FN 200 generally utilizes the same components as FN 120 except that it does not have the receive signal 131 components 132–135. Rather than using bi-directional amplifiers, e.g., 144 of FIG. 1, to replace uni-directional amplifiers, e.g., 202 of FIG. 2, and adding diplexers, e.g., 128, to the network (as is done in the proposed prior art arrangement shown in FIG. 1), the present invention instead provides a separate low-cost optical fiber communication path 270 to provide upstream communications.

According to the present invention, a low-cost mini-fiber node (MFN) 260 is used to receive return signals transmitted by end user units EUs 210–250 and to convert them for communication upstream over optical fiber 270 to FN 200. The MFN 260 includes a bandpass filter 261, a frequency conversion module (including local oscillator 263 and mixer 262), an RF amplifier 264, and a low-cost optical transmitter (XTR) 265 (e.g., a laser transmitter) for transmitting upstream digital signals over optical fiber 270. Optical fiber 270 is installed, typically, in parallel to the coax cable 201 and connects MFN 260, via coupler 280, back to the return optical fiber 103 which connects FN 200 to CO 110. The MFN 260 is implemented using bandpass filter 261 in addition to receive signal 131 components 132, 133, 135 of FN 120 of FIG. 1, such as local oscillator 263, mixer 262 and transmitter 265. The MFN 260 is deployed in the furthest downstream location on cable 201.

Because the upstream transmission from MFN 260 uses robust digital subcarrier signals, low-cost uncooled Fabry-Perot lasers (such as AT&T Astrotec lasers) could be deployed in the MFN 260 to reduce its cost. Since the present invention uses a separate optical fiber 270 for upstream communications, it also eliminates the need for and the complexity of deploying diplexers and separate upstream amplifiers as was utilized in the traditional hi-directional cable network 100a shown in FIG. 1. However, it should be clear that the present invention can also operate with the traditional bi-directional cable network 100a of FIG. 1. Therefore, the present architecture provides a very practical way for permitting an existing uni-directional coaxial cable 201 network to be upgraded for broadband hi-directional services.

With the arrangement of FIG. 2, the downstream broadcast AM-VSB and EPPV signals and switched signal 1 (shown in 201a) from FN 200 are delivered over coaxial cable 201 in the traditional way to end user units (EUs) 210–250. When EUs 210–250 transmit switched signal 2, that signal, hereinafter referred to as a "return signal," is also transmitted downstream in band B2b to MFN 260. Hence, even if cable 201 were bi-directional (like cable 141 of FIG. 1), the EUs 210–250 could, but need not, transmit a portion of the return signal (signal 2) in the traditional 5–40 MHz band B3 (FIG. 1) or any fixed pre-defined upstream band on coaxial cable 201. The EUs 210–250 can transmit information, i.e., the return signal, downstream in band B2b on coaxial cable 201. The band B2b can be defined to be any desired fraction of the total downstream bandwidth. Downstream transmission from EUs 210–250 onto coax cable 201 is done easily if the taps connecting EUs 210–250 allow power to be provided in both directions via coaxial cable 201. Drop taps that are not directional couplers allow this, and these are commonly used throughout the cable industry.

At MFN 260 the return signals from all of the EUs 210–250 are collected, filtered to remove all or part of the downstream content, up- or down-converted and transmitted as upstream signals over a previously assigned frequency band on optical fiber 270. By utilizing cable network 201 only for downstream traffic and by allocating the downstream bandwidth B5 between the EUs return signals in band B2b and the FN 200 downstream signals in bands B1a and B2a, the cable network 201 is capable of supporting any presently defined and proposed broadband two-way symmetric and asymmetric services. As noted, the MFN 260 converts the return signals from the EUs into upstream signals transmitted over optical fiber 270. Since the optical fiber 270 provides large upstream channel capacity and since the bandwidth over the coax can be partitioned with great flexibility, the resulting system is more suitable as the backbone for wireless and personal communication system (PCS) applications.

If needed, a notch filter 203 may be added to FN 200 to prevent downstream signal-induced distortion and impulse noise from falling into the return signal spectrum. If the return signals from the EUs are assigned to a high-frequency band B2b that is typically above 30 MHz, the prior art problems with ingress-noise-induced channel impairment within the traditional 5–40 MHz upstream band are eliminated.

Based on the topology of the existing coax networks (i.e., 201), the fiber 270 from the MFN 260 could either loop back to coupler 280 in FN 200 or loop to the closest position along fiber 103 to which it can easily connect. This philosophy also applies to the location of MFN 260 which can be either at an individual node or combined with the nearest FN 200 location. This provides considerable flexibility for locating MFN 260. The shortening or even elimination of the extra fiber loops could also help to reduce the cost increment.

In accordance with the invention, the upstream path 270 could also be one or more wire pairs, a coaxial cable or a radio (e.g., wireless) path. In such an arrangement, MFN 260 would include the well-known components to convert the upstream signal for transmission over the particular medium selected for the upstream path. An appropriate receiver circuit (not shown) at FN 200 would convert the received upstream signal to an optical signal which would then be coupled by coupler 280 to the optical fiber. Alternatively, the upstream path 270 could avoid FN 200 and terminate directly at CO 110. Additionally, the upstream communication can use any of the well-known forms of analog or digital communication available for the particular medium selected for the upstream path.

Figure 3:
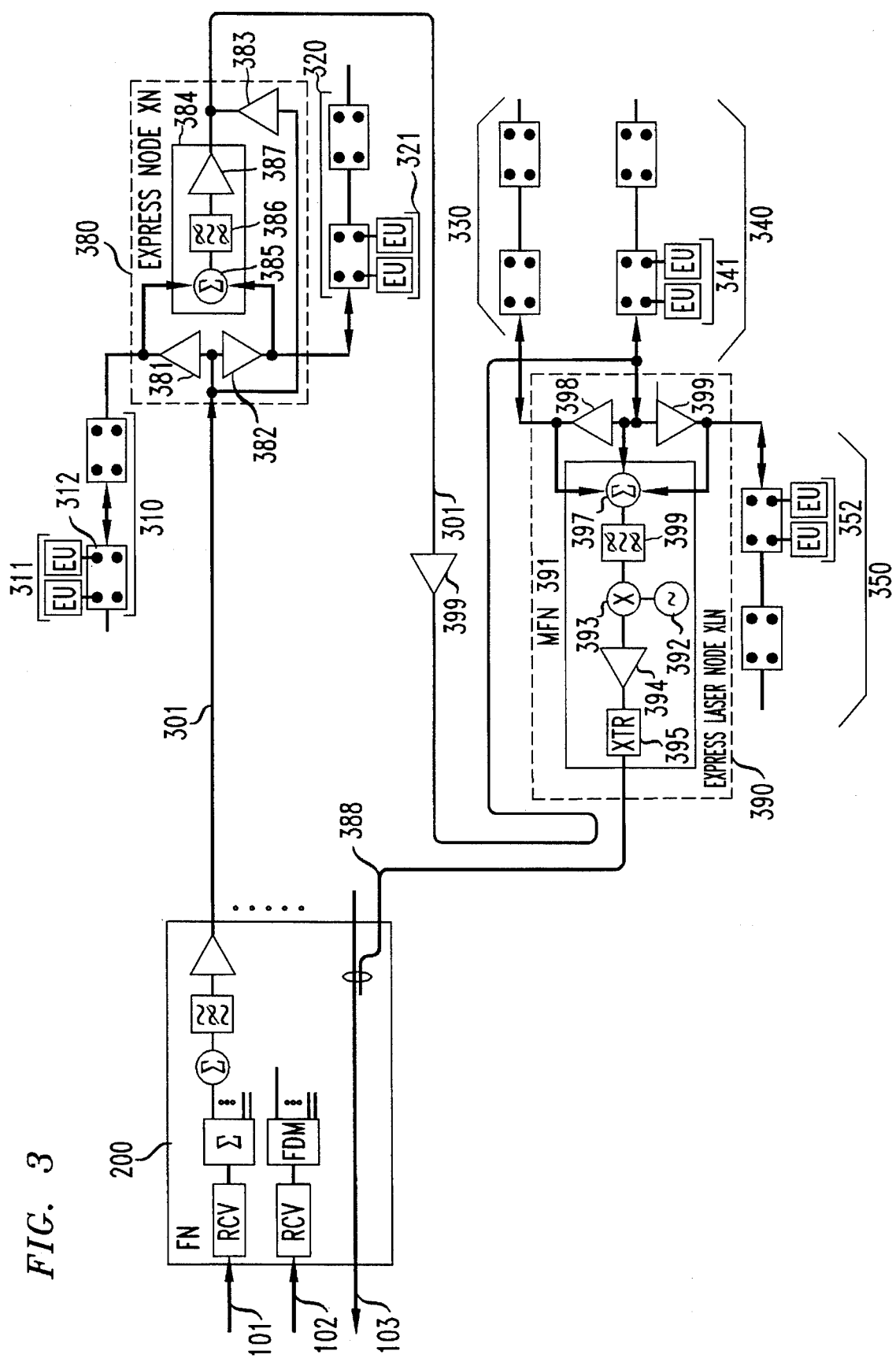
FIG. 3 shows a second illustrative embodiment of a two-way broadband network utilizing express laser nodes in accordance with the present invention.

With reference to FIG. 3, we describe another embodiment of the present invention utilizing an express node XN 380 on each primary coax branch 301 and an express laser node XLN 390 at the end of each primary coax branch 301. The XN node 380 enables end units 311,321 connected to passive tapped distribution branches 310, 320 to transmit return signals downstream over the express feeder cable 301, and amplifier 389, to the MFN 391 in express laser node XLN 390. There may be multiple XNs 380 serving multiple sets of tapped distribution branches along each primary branch 301. However, all return signal transmissions from end units (e.g., 311) are effectively transmitted upstream over their respective tapped coax branch (i.e., 310) to the express node XN 380. Hence, bi-directional services over such a coax branch (a bi-directional access path), e.g., 310, can be mixed within a common block of bandwidth (i.e., B5 of FIG. 2).

To avoid collision at the express node XN 380 or express laser node XLN 390, each user on each coax branch (i.e., 310, 320, 330, 340 and 350) needs to obey some medium access protocol. This may require, for example, that each user transmit on a different portion of an "upstream" band than all other end units. This would be frequency-division multiple access (FDMA). Alternatively, each user could be assigned a fixed or variable time slot within one frequency channel, using one of numerous well-known time-division multiple access (TDMA) protocols. Code-division multiple access (CDMA), or combinations of any medium access protocols that allow multiple users to share a common bandwidth, could be used. The term frequency-division multiplexing (FDM), referred to herein, includes any combination of FDMA, TDMA or CDMA within a plurality of predefined frequency channels of the FDM system. More specifically, a preferred embodiment would subdivide the return signal bandwidth B2b into N channels, each with some predefined information capacity. A TDMA protocol, negotiated between each EU and a CO controller, would assign several EUs to time slots within each channel, and prevent or resolve collisions in return transmission within each channel. EUs (e.g., 311) may or may not share the same return channel as the other EUs connected to the same tapped distribution cable 310.

The filter 386 is used to limit the bandwidth of the return signals to the intended band B2b. It could also be used to subdivide bandwidth B2b into separate channels such that, for example, all users 311, 321 on branches 310, 320 use a different return portion of B2b than do the users 341,352 on branches 340 and 350. If these filters 386, 396 are programmable, along with filter 203 (FIG. 2), then these allocations can be changed dynamically. Also, the total bandwidth B2b used by all EUs can be increased by changing or reprogramming these filters, allowing return bandwidth to be traded for downstream bandwidth to meet changing requirements. Alternatively, the total bandwidth B2b could be defined when the system is first installed, or upgraded.

Express node XN 380 includes amplifiers 381–383 and summer/filter circuit 384. In the express node XN 380, the circuit 384 consists of summer 385, bandpass filters 386 and amplifier 387 for selecting and sending the return signal downstream. In express node XN 380, if the bandpass filter 386 is programmable, then the return signal downstream bandwidth can be defined dynamically. Express amplifier 383 provides gain for the express or untapped feeder line or cable 301. Along coax cable 301, all of the active components (amplifiers, bridgers, etc.) are centralized to several express nodes (e.g., 380, 390) from which passive branches (e.g., 310) with drop taps (e.g., 312) are used as distribution branches.

Express laser node XLN 390 includes an MFN 391 and amplifiers 398 and 399. In XLN 390, the MFN 391 includes summer 397, bandpass filter 396, local oscillator 392, mixer 393 (or other suitable frequency translation means), amplifier 394 and laser transmitter 395.

Cost effective implementation of FIG. 3 is obtained by sharing photonic components (e.g., 395) among as many end users as possible, and also by minimizing the number of coax amplifiers (e.g., 381) utilized by the network. Based on this architecture, the express node XN 380 collects all the return signal information from all EUs (e.g., 311) it services over the passive distribution coax branches (e.g., 310) and sends it to the express laser node XLN 390 following the same downstream path over express feeder line 301. The XLN 390 combines all the return signal information from all EUs (e.g., 341, 352) it services together with all the return signal information from all EUs (e.g., 311, 321) served by other XNs (XN 380 in our example) and combines the return signals and sends it as upstream information over optical fiber 388. At FN 200 the upstream information or signal is coupled to the return fiber trunk 103. Therefore, a fiber/coax ring (using coaxial cable 301 and optical fiber 388) is realized using one or more express nodes (e.g., 380) distributed along the express feeder line (e.g., cable 301) and one express laser node XLN 390.

Due to the wide variety of existing coax network structures and geographies, it may not be possible to centralize all active components at XNs along one primary express feeder line 301. In such a case (not shown), it is desirable to deploy a sub-express line which connects to the primary express feeder line. This sub-express line may interconnect one or more XNs and an additional XLN. The above-described strategy may be used for each sub-express line as for each primary express line.

In certain coax network structures, a coax cable network 301 may exist in which it may be more practical to utilize more than one express laser node XLN 390 for upstream communication to FN 200. These multiple XLNs may then all connect, via a combiner unit, to one optical fiber (e.g., see FIG. 4) or may each utilize a separate optical fiber (not shown) for communications to FN 200. In the latter case, return transmission within each optical fiber can be detected separately using a separate optical receiver at FN 200.

Figure 4:
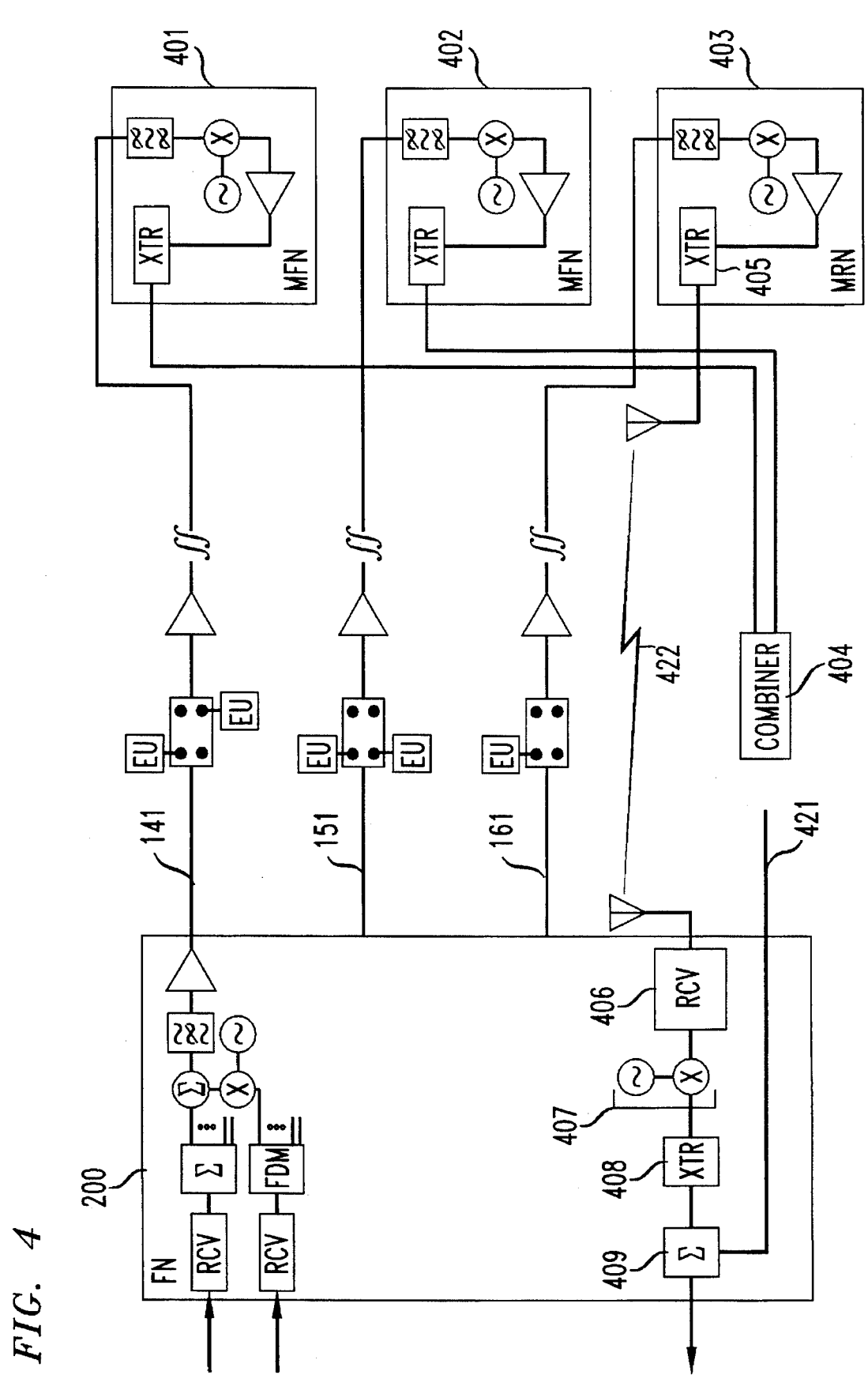
FIG. 4 shows a third illustrative embodiment of a two-way broadband network in accordance with the present invention.

Shown in FIG. 4 is another embodiment of the present invention where FN 200 serves multiple coaxial cable networks 141, 151 and 161, each communicating to different sets of end user units and each having its own MFN 401 and 402 or, alternatively, a mini-radio node (MRN) 403. The MRN uses radio transmission 422 to receiver 406, rather than optical transmission. In such an arrangement, a passive optical combiner or coupler 404 may be used to combine the return optical signals for upstream transmission over optical fiber 421 to FN 200 or to the CO (110 of FIG. 2). The combiner 404 obviously can be located separately or co-located with MFN 401, 402 or at FN 200. Each MFN must translate the frequency of its selected upstream channel to the frequency needed for subcarrier multiplexed transmission over optical fiber 421. Alternatively, a radio path 422, established between radio transmitter 405 and receiver 406, may be used for upstream transmission. Radio signals returned from MRN 403 to FN 200 can be frequency-shifted (407) and transmitted optically using laser 408 back to the CO 110 (FIG. 2). These can be combined with other return optical signals using combiner 409.

Figure 5:
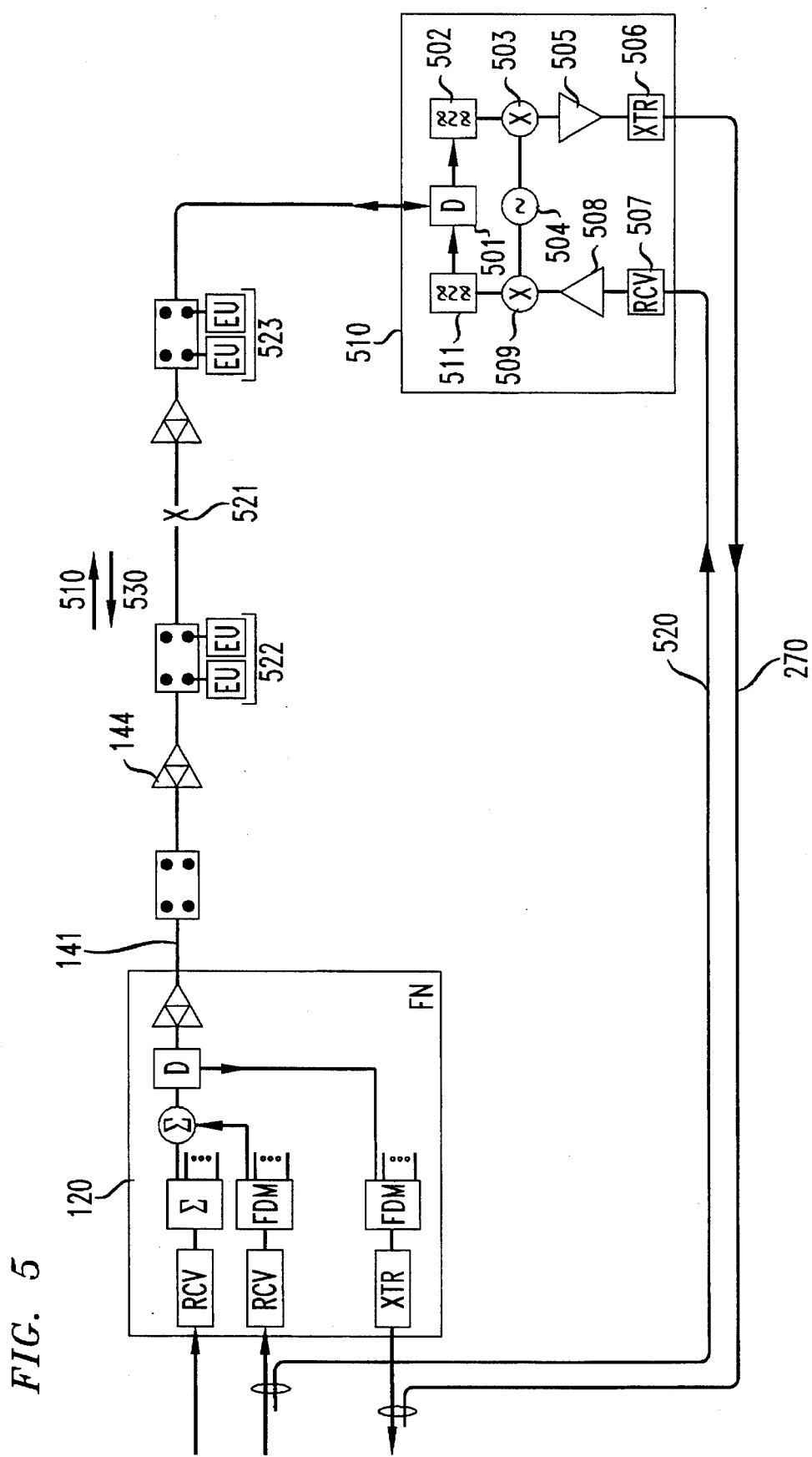
FIG. 5 shows a fourth illustrative embodiment of a two-way broadband network having fault-tolerance capability in accordance with the present invention.

With reference to FIG. 5, we describe another embodiment of the present invention having fault-tolerant or self-healing properties. The top half of FIG. 5 shows a bi-directional coax network (e.g., such as is shown in FIG. 1). MFN 510 includes the components of MFN 260 (of FIG. 2) with an additional optical receiver 507 and frequency translation section. Additionally, another optical fiber 520 is added to optical fiber 270 to interconnect FN 120 to MFN 510. The resulting FN 120, bi-directional coaxial cable network 141, MFN 510 and optical fibers 270 and 520 provide a dual-ring structure with self-healing properties.

The MFN 510 includes diplexer 501, or alternatively a splitter, and two frequency translation sections which consist of bandpass filters 502, 511, mixers 503, 509, and amplifiers 505, 508. The laser 506 is similar to laser 265 (of FIG. 2). Alternatively, receivers and transmitters for fibers 270 and 520, respectively, could reside in FN 120 rather than in CO 110 (FIG. 2) as implied by FIG. 5.

When a failure occurs in either the downstream (i.e., 510 or 520) or upstream (i.e., 530 or 270) path (i.e., amplifiers 144), or both, the EUs on the bad portion of the branch just need to exchange their upstream band with downstream bands to fully maintain the narrowband services and some of the broadband services. For example, if a break occurs in cable 141, as shown at location X (denoted 521), the EUs 523 need only exchange upstream and downstream bands to maintain service to FN 120 via MFN 510 and optical fibers 270 and 520. The EUs 522 on the other hand can maintain normal communication with FN 120 over coaxial cable 141. Hence, the network of FIG. 5 provides various possible downstream/upstream cable/fiber connection combinations such as 141/141, 141/270, 520/141 and 520/270 to provide service to EUs 522 and 523.

What has been described is merely illustrative of the application of the principles of the present invention. Other arrangements and methods can be implemented by those skilled in the art without departing from the spirit and scope of the present invention.

Figure 6:
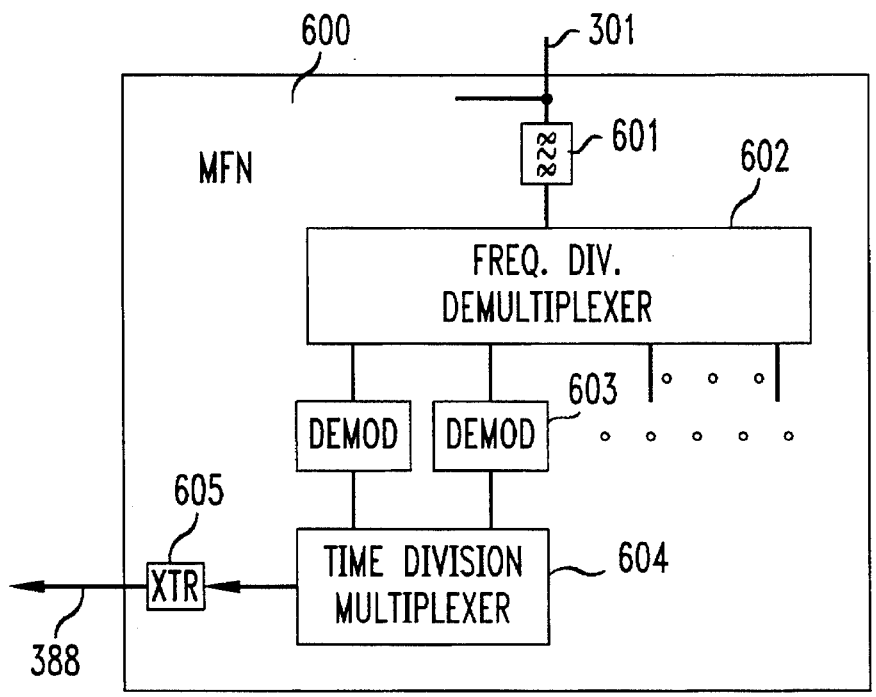
FIG. 6 shows a block diagram of another embodiment of a mini-fiber node.

For example, the MFNs (or MRNs) discussed have done only a frequency translation and filtering to select the signals for transmission back to the FN. A digital demodulator could be added to the MFN to produce baseband digital signals which are sent back to the FN, or directly to the CO. This could be done as shown by MFN 600 in FIG. 6 where, for example, passband filter 601 is used to select the appropriate return (passband) signal which, if these were frequency-division multiplexed signals, are frequency-division demultiplexed using demultiplexer 602 into a plurality of passband signals (channels). Each demultiplexed passband signal is demodulated using demodulator 603, resulting in a baseband signal for each channel. These signals can then be time-division multiplexed (604) and transmitted from baseband XTR 605 back to the FN or CO over fiber 388.

Figure 7:
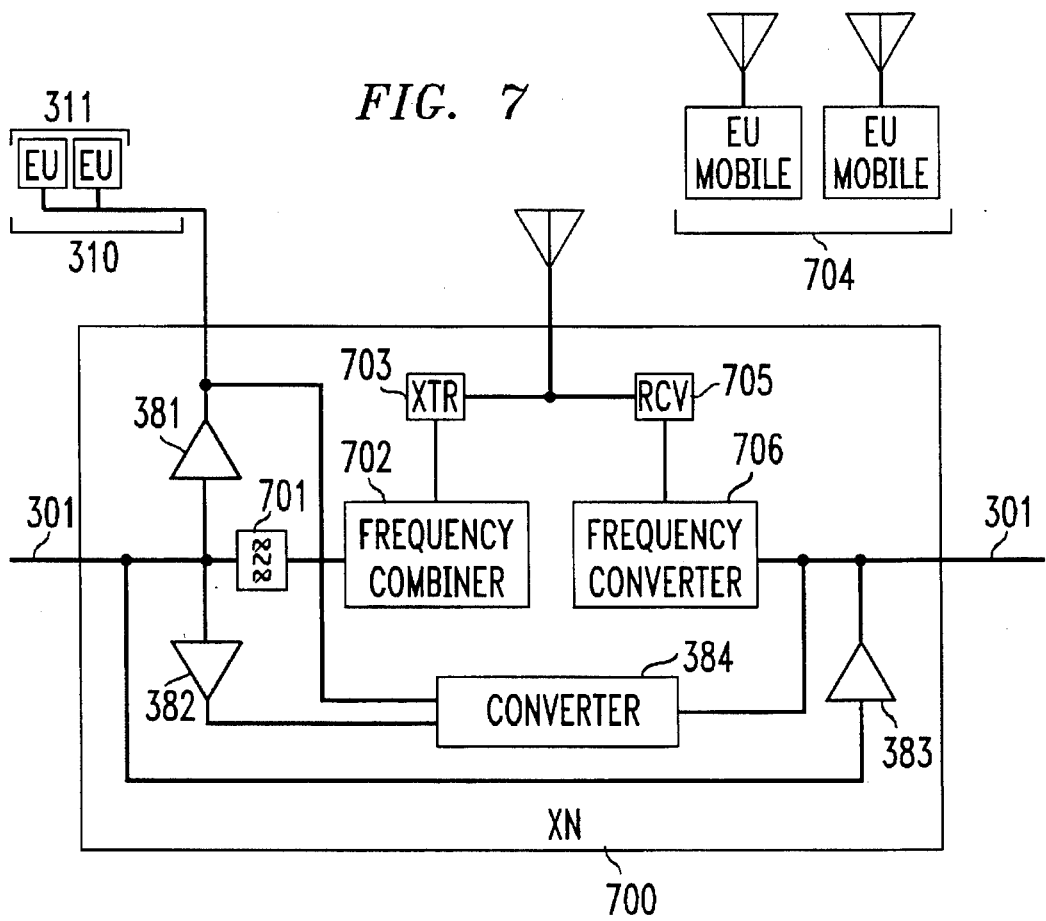
FIG. 7 shows a block diagram of another embodiment of an express node.

The MFNs or XNs could also include radio ports (RPs) for providing Personal Communication Services (PCS) or wireless services, since the invention increases the upstream (return) signal bandwidth of the coax system. With reference to FIG. 7, in such an arrangement, the signals to be broadcast over the air in the vicinity of an express node XN 700 would be transmitted downstream over the coax 301 within a portion of spectrum B2a (FIG. 2). The appropriate RF broadcast signal would be selected using filter 701 and converted to an appropriate air frequency using frequency converter 702; then transmitted by XTR 703 to multiple fixed or mobile end users 704. Return transmissions from 704 are received by receiver 705 and converted by frequency converter 706 to the desired frequency or format for transmission over cable 301. This wireless capability can be supported simultaneously with the previously described wired services provided to EUs 311 over coax branch 310 using the previously described amplifiers 381–383 and circuit 384.

The same wireless service can also be supported by the XLN 390 (FIG. 3) by including the same hardware as described in FIG. 7. However, rather than converting the received (return) over-the-air signal transmission to a frequency and format suitable for transmission over cable 301, the return signals are instead converted for transmission back to the FN or CO over the second path 388 (FIG. 3).

This conversion could be a simple frequency translation, or could include digital processing such that digital signals are returned to the FN or CO.

It is understood that the transmission of return signals from each EU can occur at any frequency (e.g., from 5 MHz to 1 GHz) provided that these return signals are sent downstream to the MFN prior to being selected and sent over the second path to the FN or CO. Also, all or part of the downstream spectrum that is selected, converted and returned to the FN or CO can be used to evaluate the status of the system's performance. For example, the continuity of the coax/fiber ring structure can be determined by having each element, including the FN and all XNs, transmit an identifier tone or signal downstream to the MFN. Hence, the status of each element or system can be determined by evaluating the sum of all such status signals returned over the second path.

In addition, various well-known forms of multiplexing can be used in place of the optical combiner (e.g., 409 of FIG. 4) to combine the plurality of return paths (second paths) terminating at the FN. For example, different optical wavelengths could be transmitted from the laser transmitter at each MFN (e.g., 401 and 402 of FIG. 4) and a wave-division multiplexer (WDM) combiner could be used to combine the wavelengths at the FN (or other location), e.g., combiner 404, for transmission back to the CO. Alternatively, the signals sent from each MFN could be coded and, using a well-known code-division multiplexing scheme, combined at the FN for transmission back to the CO. Either of these examples would be appropriate if the previously mentioned techniques were used to obtain baseband digital return signals at each MFN.

If we want to be able to dynamically control, or allocate, return bandwidth, then some portion of downstream spectrum can be used to provide control information with which to set the status or frequency of tunable filters (e.g., 261, 203 of FIG. 2).

The XN 380 (FIG. 3) is limited in function to filtering using bandpass filter 386. However, according to another aspect of the invention, the XN 380 can include additional converting functions. For example, EUs 311 could transmit upstream over coax branch 310 using baseband digital transmission, or some coded variant thereof, to a modified converter apparatus 384. This new converter apparatus 384 could then convert the plurality of signals from EUs 311 into a passband signal that can be combined with other downstream signals and transmitted to the MFN 391. This conversion could be done, for example, using a modem within apparatus 384. This modem would effectively replace the multiple modems originally required at the EUs 311.

As an alternative approach, another network embodiment includes a structure similar to that shown in FIG. 3. In parallel to primary coax branch 301, an additional coax branch is installed. Instead of sending return signals from an access path (e.g., 310, 320) downstream over the primary branch 301, the unit 384 sends the return signals upstream to FN 200 over the additional coax branch.

Although the description thus far has focused on a coaxial cable distribution system (e.g., 100a of FIG. 1), the techniques would also apply to an optical distribution system. In this case, for example, the coaxial cable 141 would be replaced by an optical fiber; drop taps 143 would be replaced with the appropriate optical couplers; and amplifier 144 would be replaced with optical amplifiers. All these components are well known in the prior art. This fiber distribution network would be served by lasers, rather than by amplifier 129. Upstream and downstream transmission could be separated using an optical splitter or wavelength multiplexer, in place of diplexer 128. In place of the frequency-division multiplexing that was used to combine multiple channels over the coax, as shown by 141a, optical frequency-division multiplexing (also referred to as wavelength-division multiplexing) would be used. The parallel between electrical and optical frequency-division multiplexing is well known. Hence, the techniques disclosed herein would also solve anticipated limitations in achieving suitable return bandwidth in optical access systems.

It should be noted that the previously described communication paths (e.g., first, second, primary and access communication paths) could be formed from one or more path segments selected from a group including coaxial cable, optical fiber, one or more wire pairs, or a radio communication path.

We claim:

1. A communication network comprising a signal distribution unit for transmitting frequency division multiplexed communication signals downstream over a first communication path to a plurality of end user apparatuses connected thereto, said network further comprising at least one end user apparatus including means for sending return signals downstream over at least some portion of said first communication path, and a converter apparatus for collecting the return signals received over said first communication path to form a combined signal and for converting the combined signal to an upstream signal for transmission upstream over a second separate communication path to said distribution unit.

2. The network of claim 1 wherein said first communication path is formed from one or more path segments selected from a group including coaxial cable, optical fiber, and one or more twisted wire pairs.

3. The network of claim 1 wherein said second communication path is formed from one or more path segments selected from a group including coaxial cable, optical fiber, one or more twisted wire pairs, and radio communication path.

4. The network of claim 1 wherein the communication signals and return signals are sent over communication channels of said first communication path that are dynamically allocated by the network.

5. The network of claim 1 including a second converter apparatus connected over a different first communication path and wherein each converter apparatus receives return signals from at least one end user apparatus and each converter apparatus uses a different second communication path for upstream signal transmission to said distribution unit and wherein upstream signals of said second communication paths are combined at said distribution unit.

6. The network of claim 1 including a second converter apparatus connected over a different first communication path and wherein each converter apparatus receives return signals from at least one end user apparatus and each converter apparatus uses a different second communication path for upstream signal transmission to said distribution unit and wherein upstream signals of said second communication paths are combined in a combiner unit that is not co-located with said distribution unit.

7. The network of claim 1 wherein at least one end user apparatus is arranged to transmit at least a portion of said return signals upstream over a portion of said first communication path to said distribution unit.

8. The network of claim 7 wherein
said converter apparatus is arranged for receiving at least a portion of said communication signals over a different second communication path and for converting the received signals and for transmitting the converted signals to said at least one end user apparatus over a portion of said first communication path.

9. The network of claim 1 wherein
said converter apparatus is arranged for receiving at least a portion of said communication signals over a different second communication path and for converting the received signals and for transmitting the converted signals to said at least one end user apparatus over a portion of said first communication path.

10. The network of claim 1 wherein
the frequency-division multiplexed signals include broadcast signals to be received by all of said at least one end user apparatus and switched signals addressed to less than all of said at least one end user apparatus.

11. A communication network comprising a signal distribution unit for transmitting communication signals downstream to a plurality of end user apparatuses over a signal distribution system that includes a uni-directional primary path and a bi-directional access path, said network further comprising
at least one end user apparatus including means for sending return signals upstream over the access path,
a node apparatus for combining downstream communication signals from the primary path and upstream return signals from the access path into a combined signal and for transmitting the combined signal to a converter apparatus, wherein said node apparatus transmits the combined signal downstream over a portion of the primary path to said converter apparatus, and
said converter apparatus for receiving and converting at least a portion of the combined signal to an upstream signal for transmission over a second separate communication path to said distribution unit.

12. The network of claim 11 wherein said communication signals are frequency-division multiplexed (FDM) signals.

13. The network of claim 12 wherein the FDM signals include broadcast signals to be received by all of said at least one end user apparatus and switched signals addressed to less than all of said at least one end user apparatus.

14. The network of claim 11 wherein the said portion of the combined signal includes the upstream return signals.

15. The network of claim 11 wherein said node apparatus and said converter apparatus are co-located.

16. The network of claim 11 wherein
the primary and access paths are formed from one or more path segments selected from a group including coaxial cable, optical fiber, and one or more twisted wire pairs, and the second path is an optical fiber,
said converter apparatus includes an optical source for converting the combined signal into an optical upstream signal, and
said distribution unit includes means for receiving said optical upstream signal.

17. The network of claim 11 wherein
the primary and access paths are formed from one or more path segments selected from a group including coaxial cable, optical fiber, and one or more twisted wire pairs, and the second path is a radio link,
said converter apparatus includes a radio transmitter for converting the combined signal into a radio upstream signal, and
said distribution unit includes means for receiving said radio upstream signal.

18. The network of claim 11 wherein
the primary and access paths are formed from one or more path segments selected from a group including coaxial cable, optical fiber, and one or more twisted wire paths, and the second path is formed from one or more path segments selected from a group including optical fiber, a radio link, coaxial cable and one or more twisted wire pairs.

19. A communication network comprising a signal distribution unit for transmitting communication signals downstream to a plurality of end user apparatuses over a signal distribution system that includes a uni-directional primary path and a hi-directional access path, said network further comprising
at least one end user apparatus including means for sending return signals upstream over the access path.
a node apparatus for combining downstream communication signals from the primary path and upstream return signals from the access path into a combined signal and for transmitting the combined signal to a converter apparatus, and
said converter apparatus for receiving and converting at least a portion of the combined signal to an upstream signal for transmission over a second separate communication path to said distribution unit, and wherein
said node apparatus includes wireless means for transmitting downstream communication signals to another one or more end user apparatuses and wireless means for receiving return signals from said one or more end user apparatuses and
said another one or more end user apparatuses includes wireless means for receiving downstream communication signals from said node apparatus and wireless means for transmitting return signals to sail node apparatus.

20. A communication network comprising a signal distribution unit for transmitting communication signals downstream to a plurality of end user apparatuses over a signal distribution system that includes a uni-directional primary path and a bi-directional access path, said network further comprising
at least one end user apparatus including means for sending return signals upstream over the access path,
a node apparatus for combining downstream communication signals from the primary path and upstream return signals from the access path into a combined signal and for transmitting the combined signal to a converter apparatus,
said converter apparatus for receiving and converting at least a portion of the combined signal to an upstream signal for transmission over a second separate communication path to said distribution unit, and
another one or more end user apparatuses having means for sending return signals over a second access path to said converter apparatus and wherein
said converter apparatus combines the downstream communication signal from the primary path, the upstream return signals from the access path, and the return signals from the second access path to form the combined signal.

21. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, said converter apparatus for receiving and converting at least a portion of the combined signal to an upstream signal for transmission over a second separate communication path to said distribution unit, and wherein said node apparatus includes a converter means for converting upstream return signals from the access path from the format used over the access path into a different format used for combining with downstream communication signals.

22. The network of claim 11 wherein the communication signals and return signals sent over said portion of the primary path are dynamically allocated by the network.

23. The network of claim 11 including a second converter apparatus connected over a different primary path and wherein each converter apparatus receives return signals from at least one end user apparatus and each converter apparatus uses a different second communication path for upstream signal transmission to said distribution unit and wherein upstream signals of said second communication paths are combined at said distribution unit.

24. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, said converter apparatus for receiving and converting at least a portion of the combined signal to an upstream signal for transmission over a second separate communication path to said distribution unit, and a second converter apparatus connected over a different primary path and wherein each converter apparatus receives return signals from at least one end user apparatus and each converter apparatus uses a different second communication path for upstream signal transmission to said distribution unit and wherein upstream signals of said second communication paths are combined in a combiner unit that is not co-located with said distribution unit.

25. The network of claim 11 wherein said uni-directional primary path is modified to include a bi-directional capability and said node apparatus is arranged to transmit at least a portion of said return signals from the access path over a portion of said modified primary path to said distribution unit.

26. The network of claim 25 wherein said converter apparatus is arranged for receiving at least a portion of said communication signals over a different second communication path and for conveying the received signals and for transmitting the conveyed signals to said at least one node apparatus over a portion of said modified primary path.

27. The network of claim 1 wherein said converter apparatus uses baseband digital signals to transmit upstream to said distribution unit.

28. The network of claim 1 wherein said converter apparatus uses passband signals to transmit upstream to said distribution unit.

29. The network of claim 1 wherein said converter apparatus includes passband filter means for passing the return signals and filtering downstream communication signals prior to converting the return signals to the upstream signal.

30. The network of claim 1 wherein the combined signal includes multiplexed modulated combined signals and wherein said converter apparatus includes means for selecting at least one of the multiplexed modulated combined signals, demodulator means for demodulating the selected combined signals into baseband return signals, and time-division multiplexer means for generating a time-division multiplexed upstream signal from the selected baseband return signals.

31. The network of claim 1 wherein the combined signal is a modulated signal and wherein said converter apparatus includes demodulator means for converting the combined signal to a baseband upstream signal.

32. A method of operating a communication network comprising a signal distribution unit for transmitting frequency division multiplexed communication signals downstream over a first communication path to a plurality of end user apparatuses connected thereto, said method comprising the steps of at said plurality of end user apparatuses, sending the return signals downstream over at least some portion of said first communication path, receiving the return signals over said first communication path at a converter apparatus, and conveying the received return signals into an upstream signal for transmission over a second separate communication path to said distribution unit.

33. A method of operating a communication network comprising a signal distribution unit for transmitting communication signals downstream to a plurality of end user apparatuses over a distribution system that includes a uni-directional primary path and a bi-directional access path, said method comprising the steps of at an end user apparatus, sending return signals upstream over said bi-directional access path, combining downstream signals from the primary path and upstream signals from the access path into a combined signal, and converting at least a portion of the combined signal to an upstream signal and transmitting it over a second separate communication path to said distribution unit, and wherein the combining step is performed by a first apparatus at a first location and the method further includes the step of transmitting the combined signal over a portion of the primary path to a second apparatus, and wherein the converting step is performed by said second apparatus at a second location.

34. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, said converter apparatus for receiving and converting at least a portion of the combined signal to an upstream signal for transmission over a second separate communication path to said distribution unit, wherein said converter apparatus uses passband signals to transmit upstream to said distribution unit and wherein said network enables the dynamic allocation of the bandwidth of at least one of the downstream and upstream signals.

35. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, said converter apparatus for receiving and converting at least a portion of the combined signal to an upstream signal for transmission over a second separate communication path to said distribution unit, wherein said converter apparatus includes passband filter means for passing the return signals and filtering downstream communication signals prior to converting the return signals to the upstream signal and wherein said network enables the dynamic allocation of the bandwidth of at least one of the downstream and upstream signals.

36. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, and said converter apparatus for receiving and converting at least a portion of the combined signal to an upstream signal for transmission over a second separate communication path to said distribution unit, and wherein the combined signal includes multiplexed modulated combined signals and said converter apparatus includes means for selecting at least one of the multiplexed modulated combined signals, demodulator means for demodulating the selected combined signals into baseband return signals, and time-division multiplexer means for generating a time-division multiplexed upstream signal from the selected baseband return signals.

37. A communication network comprising a signal distribution unit for transmitting communication signals downstream to a plurality of end user apparatuses over a signal distribution system that includes a uni-directional primary path and a bi-directional access path, said network further comprising at least one end user apparatus including means for sending return signals upstream over the access path, a node apparatus for combining downstream communication signals from the primary path and upstream return signals from the access path into a combined signal and for transmitting the combined signal to a converter apparatus, and said converter apparatus for receiving and converting at least a portion of the combined signal to an upstream signal for transmission over a second separate communication path to said distribution unit, and wherein the combined signal is a modulated signal and said converter apparatus includes demodulator means for converting the combined signal to a baseband upstream signal.

38. The network of claim 11 wherein said converter apparatus uses baseband digital signals to transmit upstream to said distribution unit.

* * * * *